(12) United States Patent
Yoshizawa et al.

(10) Patent No.: US 11,556,244 B2
(45) Date of Patent: Jan. 17, 2023

(54) INPUT INFORMATION CORRECTION METHOD AND INFORMATION TERMINAL

(71) Applicant: Maxell, Ltd., Kyoto (JP)

(72) Inventors: Kazuhiko Yoshizawa, Kyoto (JP); Yasunobu Hashimoto, Kyoto (JP); Akira Ishiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/957,388

(22) PCT Filed: Dec. 28, 2017

(86) PCT No.: PCT/JP2017/047199
§ 371 (c)(1),
(2) Date: Jun. 24, 2020

(87) PCT Pub. No.: WO2019/130538
PCT Pub. Date: Jul. 4, 2019

(65) Prior Publication Data
US 2020/0319795 A1   Oct. 8, 2020

(51) Int. Cl.
*G06F 3/04886* (2022.01)
*G06F 40/166* (2020.01)
(Continued)

(52) U.S. Cl.
CPC ........ *G06F 3/04886* (2013.01); *G06F 3/0488* (2013.01); *G06F 40/166* (2020.01); *G06F 40/232* (2020.01)

(58) Field of Classification Search
CPC .. G06F 3/04886; G06F 40/232; G06F 3/0488; G06F 40/166
See application file for complete search history.

(56) References Cited

U.S. PATENT DOCUMENTS

| 5,022,081 A * | 6/1991 | Hirose | G06K 9/033 |
| | | | 704/235 |
| 2003/0011638 A1 | 1/2003 | Chung | |

(Continued)

FOREIGN PATENT DOCUMENTS

| JP | 4-184524 A | 7/1992 |
| JP | 9-305315 A | 11/1997 |

(Continued)

OTHER PUBLICATIONS

International Search Report of PCT/JP2017/047199 dated Mar. 6, 2018.

(Continued)

*Primary Examiner* — Keith D Bloomquist
(74) *Attorney, Agent, or Firm* — Mattingly & Malur, PC

(57) ABSTRACT

Information is read, which relates to an array of objects for input that have been displayed on a display unit upon input of input information. Whether an input object of the input information that is displayed on the display unit has been touched is determined. When the input object is determined as having been touched, the touched input object is recognized as an object to be corrected. A correction candidate object based on the array of the objects for input is displayed in the vicinity of the object to be corrected. Whether the correction candidate object has been touched is determined. When the correction candidate object is determined as having been touched, the object to be corrected is replaced with the touched correction candidate object.

18 Claims, 10 Drawing Sheets

(51) Int. Cl.
*G06F 40/232* (2020.01)
*G06F 3/0488* (2022.01)

(56) References Cited

U.S. PATENT DOCUMENTS

| | | | |
|---|---|---|---|
| 2005/0222985 A1* | 10/2005 | Buchheit | G06F 3/0482 |
| 2005/0283726 A1* | 12/2005 | Lunati | G06F 40/232 |
| | | | 715/257 |
| 2006/0167676 A1* | 7/2006 | Plumb | G06F 40/232 |
| | | | 704/6 |
| 2008/0109220 A1* | 5/2008 | Kiss | G10L 15/26 |
| | | | 704/235 |
| 2010/0218141 A1* | 8/2010 | Xu | H04M 1/72586 |
| | | | 715/834 |
| 2010/0251105 A1* | 9/2010 | Dubs | G06F 3/0237 |
| | | | 345/173 |
| 2011/0018812 A1* | 1/2011 | Baird | G06F 3/04886 |
| | | | 345/173 |
| 2011/0035209 A1* | 2/2011 | Macfarlane | G06F 3/04886 |
| | | | 704/9 |
| 2011/0154246 A1* | 6/2011 | Oh | G06F 3/04886 |
| | | | 715/773 |
| 2015/0058785 A1* | 2/2015 | Ookawara | G06F 3/018 |
| | | | 715/773 |
| 2016/0110332 A1* | 4/2016 | Yu | G06F 3/0233 |
| | | | 715/271 |
| 2016/0275070 A1* | 9/2016 | Corston | G06F 40/253 |
| 2017/0262722 A1* | 9/2017 | Nanaumi | G06F 40/274 |
| 2017/0270086 A1* | 9/2017 | Fume | G06F 3/0488 |
| 2019/0121533 A1* | 4/2019 | Wang | G06F 3/0237 |

FOREIGN PATENT DOCUMENTS

| | | |
|---|---|---|
| JP | 2003-099172 A | 4/2003 |
| JP | 2013-150085 A | 8/2013 |
| JP | 2014-089694 A | 5/2014 |
| JP | 2014-103533 A | 6/2014 |
| JP | 2014-183485 A | 9/2014 |
| JP | 2014-194704 A | 10/2014 |
| JP | 2015-41845 A | 3/2015 |
| JP | 2015-215679 A | 12/2015 |
| JP | 2016-52042 A | 4/2016 |

OTHER PUBLICATIONS

Japanese Office Action received in corresponding Japanese Application No. 2019-561522 dated May 11, 2021.
Japanese Office Action received in corresponding Japanese Application No. 2021-143505 dated Aug. 9, 2022.

* cited by examiner

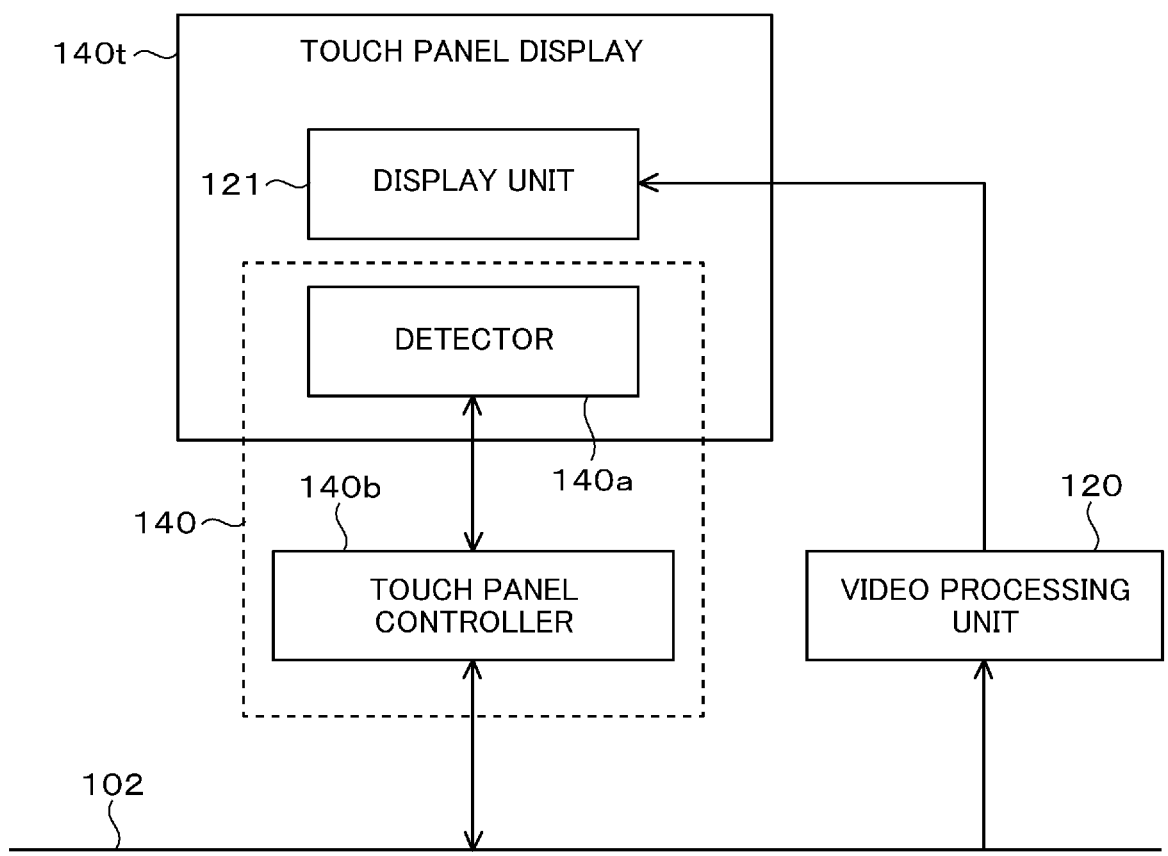
F I G. 3

F I G. 4
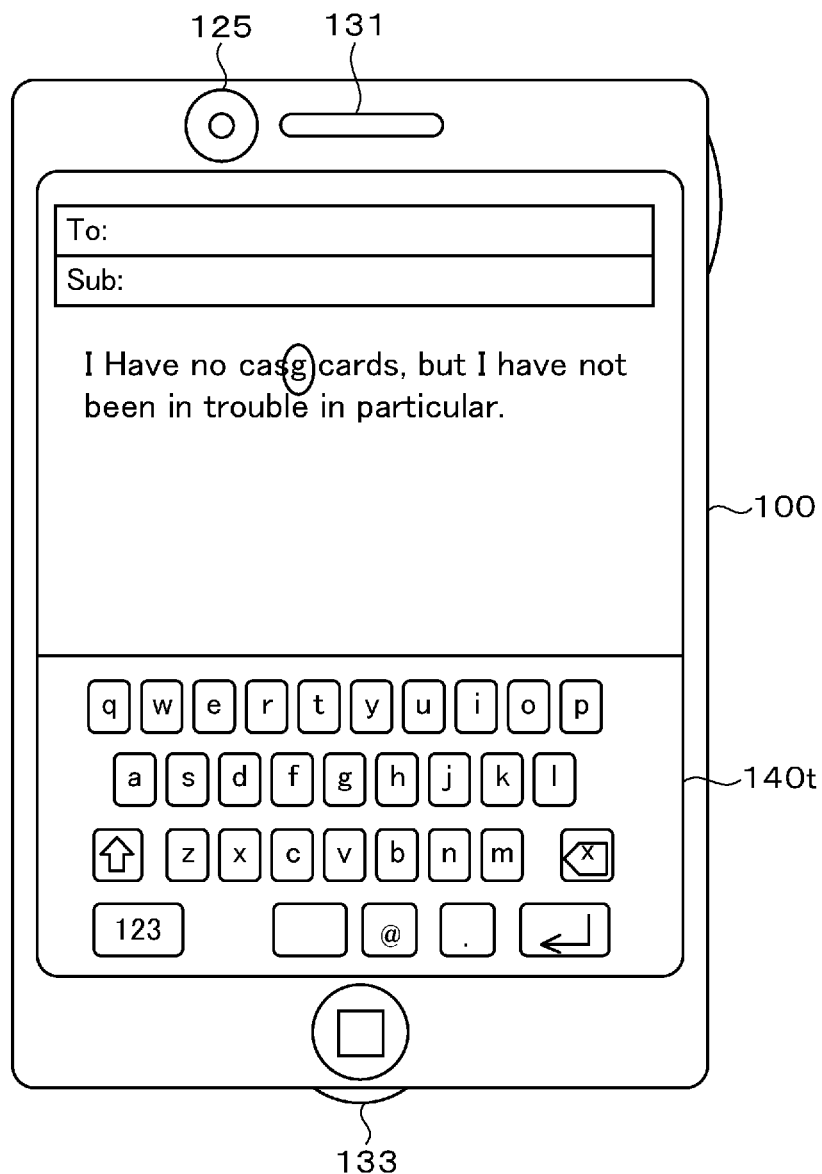

F I G. 9
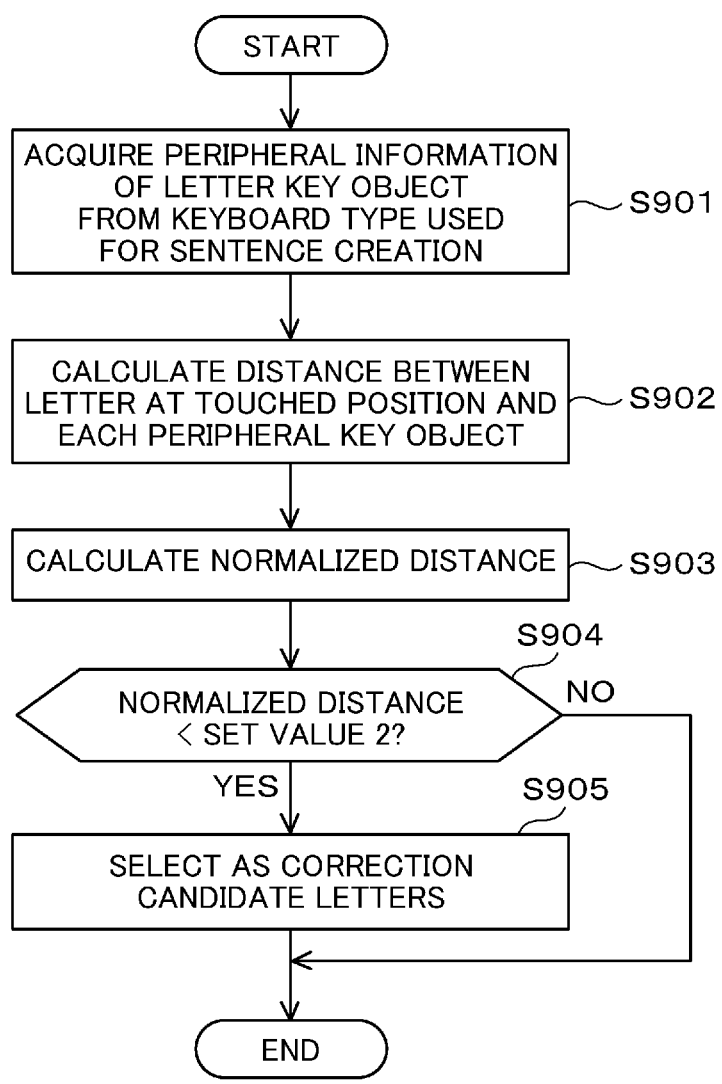

(1) QWERTY LAYOUT SOFTWARE KEYBOARD 1

(2) QWERTY LAYOUT SOFTWARE KEYBOARD 2

INPUT INFORMATION CORRECTION METHOD AND INFORMATION TERMINAL

TECHNICAL FIELD

The present invention relates to an input information correction method and an information terminal, and more particularly to a method for correcting input information with a software keyboard on a touch panel that is widely used for a mobile phone device, a tablet PC (Personal Computer), or the like.

BACKGROUND ART

In recent years, information terminal devices such as mobile phones, smartphones, and tablet terminals are widely used. The information terminal devices have not only a calling function but also various functions, such as mailing, SNS (Social Networking Service) communication, a memo, web searching, and schedule management. As letter input means necessary for these functions, a software keyboard to be displayed on a touch panel to input letters is widely used. The software keyboard is displayed on the touch panel when it is necessary to input a letter. Thus, it is not necessary to secure a location where keys are installed, unlike hardware keyboards. Therefore, the number of devices that use a software keyboard for downsizing of the devices and the multifunctionalization of input means is increasing. However, when a display screen on which a software keyboard is displayed is small, a detection region for detecting a touch operation of touching each key on the software keyboard is narrow. Thus, erroneous input caused by an erroneous operation of an adjacent key occurs easily. Every time erroneous input occurs, the burden of correcting an erroneously input letter arises. Therefore, a technique capable of easily correcting an erroneously input letter without making a configuration complex and without a reduction in a letter input speed is requested.

As an example, the following Patent Literature 1 discloses a technique for displaying a correction candidate letter in the vicinity of a delete key on a software keyboard when a correction letter is deleted. In addition, Patent Literature 2 describes a technique for enlarging and displaying a correction candidate letter in the vicinity of a deleted key on a software keyboard when a correction letter is deleted.

CITATION LIST

Patent Literature

PTL 1: Japanese Patent Application Laid-Open No. 2014-183485
PTL 2: Japanese Patent Application Laid-Open No. 2014-103533

SUMMARY OF INVENTION

Technical Problem

The technique described in Patent Literature 1 reduces the burden of correcting a letter by calculating priorities for correction candidate letters on a software keyboard from relationships between a letter to be corrected and the arrangement of the software keyboard and displaying a correction candidate letter in the vicinity of a delete key in accordance with the priorities. However, to correct a letter, it is necessary to perform a procedure for touching a gap between the letter to be corrected and another letter, moving a cursor, and operating a delete key, and there is a problem that an operation for the correction procedure is still cumbersome.

The technique described in Patent Literature 2 reduces the burden of correcting a letter by enlarging and displaying an adjacent letter in the letter arrangement of the software keyboard in the vicinity of a correction letter deleted on the software keyboard. However, to correct a letter, it is necessary to perform a procedure for touching a gap between the letter to be corrected and another letter, moving a cursor, and operating a delete key, and there is a problem that an operation for the correction procedure is still cumbersome, like Patent Literature 1. As described above, the operations for the procedures for correcting input information such as a letter are still cumbersome and a technique for solving this point has been requested.

An object of the present invention is to provide an input information correction method and an information terminal that are capable of correcting input information with a smaller number of touch operations, compared to conventional techniques.

Solution to Problem

As means for solving the problems, techniques described in claims are used.

As an example, an input information correction method according to the present invention is recognized as an input information correction method that includes reading information on an array of objects for input that have been displayed on a display unit upon input of input information; determining whether an input object of the input information that is displayed on the display unit has been touched; recognizing, when the input object is determined as having been touched, the touched input object as an object to be corrected; displaying a correction candidate object based on the array of the objects for input in the vicinity of the object to be corrected; determining whether the correction candidate object has been touched; and replacing, when the correction candidate object is determined as having been touched, the object to be corrected with the touched correction candidate object.

Advantageous Effects of Invention

According to the present invention, it is possible to correct input information with a smaller number of touches, compared to conventional techniques.

BRIEF DESCRIPTION OF DRAWINGS

FIG. 3 is a configuration diagram of a touch panel display according to the example.
FIG. 4 illustrates an input example of a mail document according to the example.

FIG. 9 illustrates a subroutine process of selecting a correction candidate letter according to the example.

DESCRIPTION OF EMBODIMENTS

Hereinafter, an example of an embodiment of the present invention is described using the drawings. The embodiment described below is an example and is not limited to the following embodiment. In addition, parts of the embodiment described below may be combined and implemented. In addition, the case where a user corrects a letter object is described as an example. However, for example, the embodiment is also applicable to the case where input information including an input object that is not a letter and is a number, a sign, a code, or the like is corrected. In addition, the embodiment is applicable to not only the case where an error of the foregoing input object is properly corrected but also the case where the foregoing input object is modified. Specifically, in the following example, "correct" may be interpreted as "modify".

Example

Figure 1:
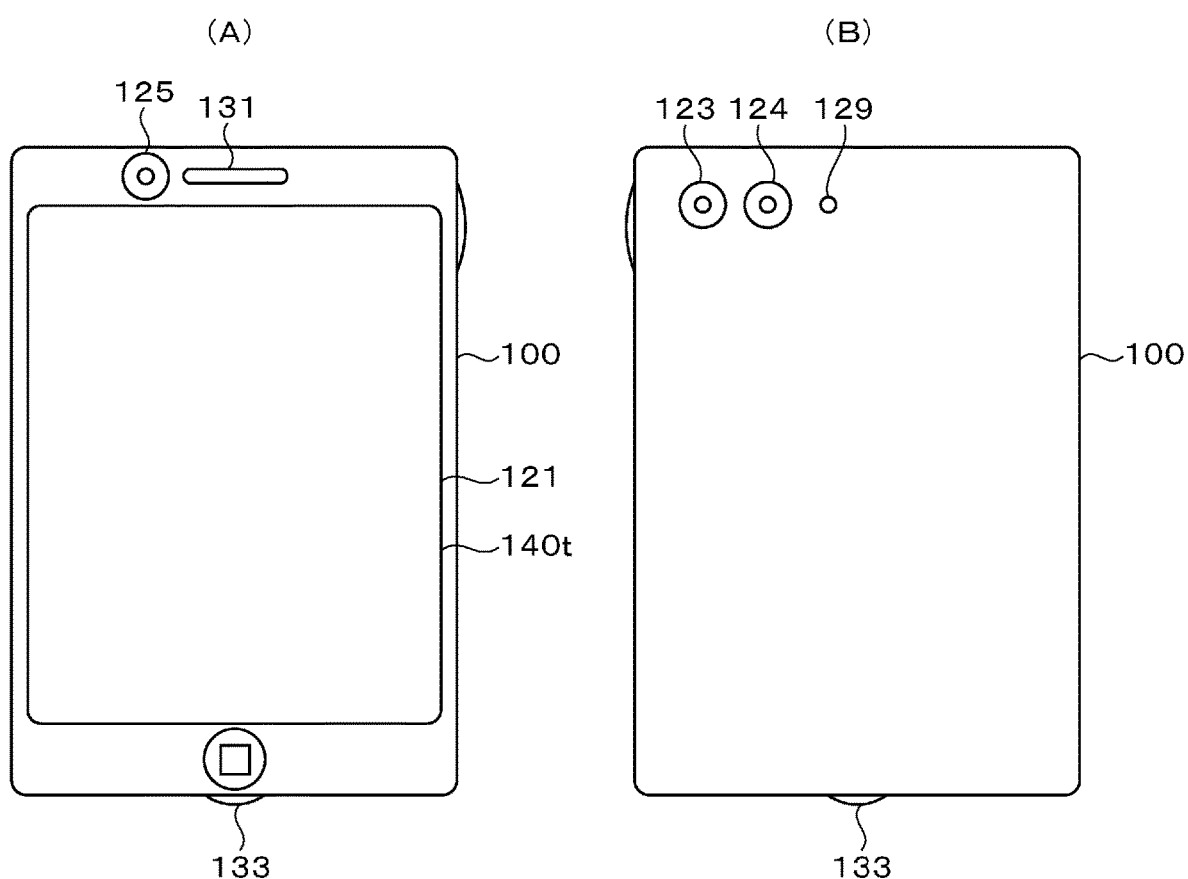
FIG. 1 is an external view of an information terminal according to an example.

FIG. 1 is an external view of an information terminal 100 according to the present example. The external view is an example of the case where the information terminal 100 is an information terminal device such as a smartphone. (A) in FIG. 1 indicates a front surface diagram of the information terminal 100, and (B) in FIG. 1 indicates a back surface (rear surface) diagram of the information terminal 100. Illustrations of left and right side surfaces, top and bottom surfaces, and the like are omitted. As illustrated in the drawing, in the present example, a third video input unit 125 is located on the same surface (front surface) as a display unit 121. A first video input unit 123 and a second video input unit 124 are located on the opposite surface (back surface) to the display unit 121. In addition, a flash unit 129 is arranged adjacent to the first video input unit 123 and the second video input unit 124. The third video input unit 125 located on the same surface as the display unit 121 is hereinafter referred to as "in-camera" in some cases. Each of the first video input unit 123 and the second video input unit 124 that are located on the opposite surface to the display unit 121 is hereinafter referred to as "out-camera" in some cases. The positions of the first video input unit 123 and the second video input unit 124 that are located on the back surface in the present example may be located on the same surface as the display unit 121. In addition, the first video input unit 123 and the second input unit 124 may be configured as a single unified unit.

Figure 2A:
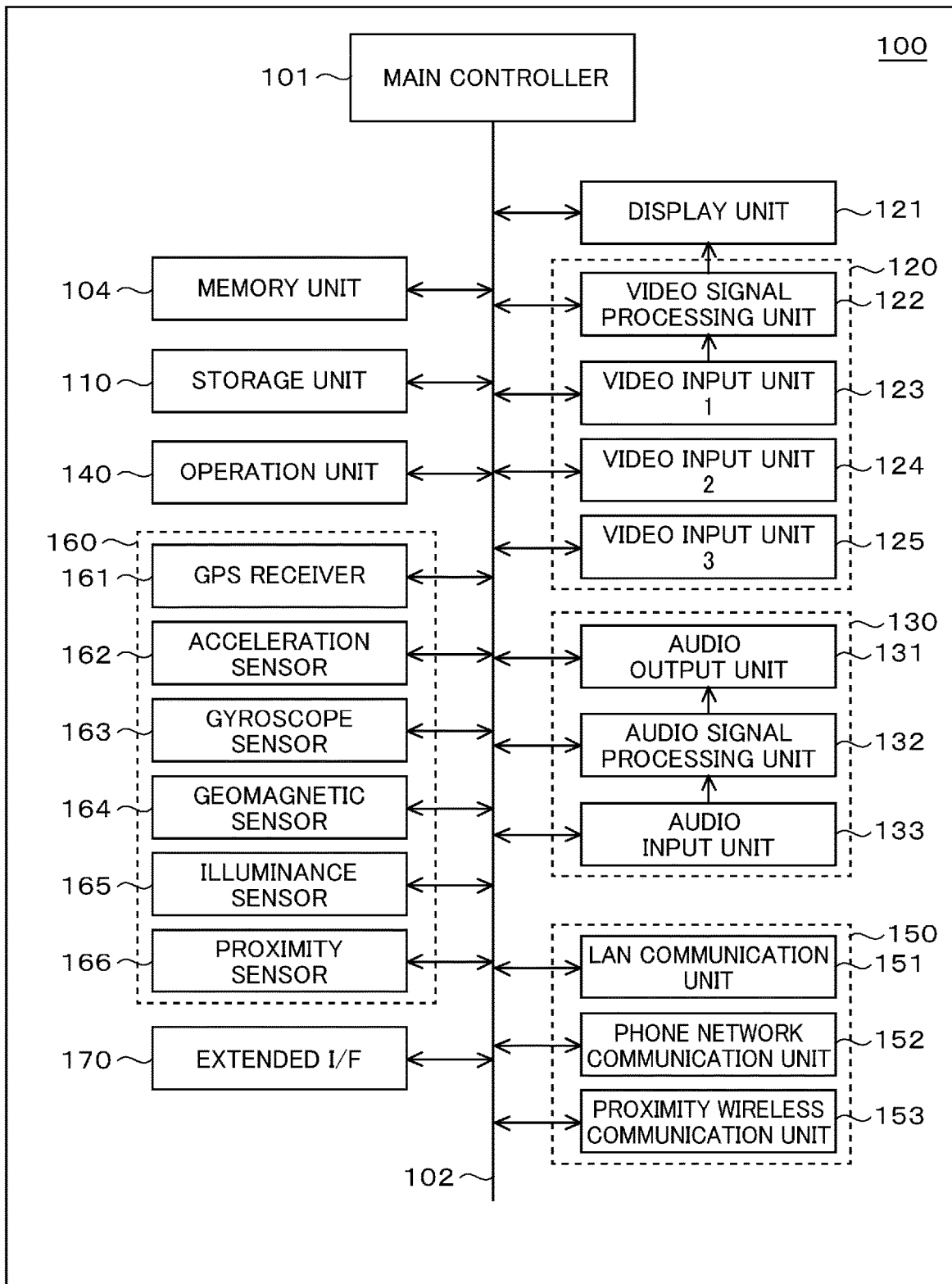
FIG. 2A is a block diagram of the information terminal according to the example.

FIG. 2A is a block diagram of the information terminal 100 according to the present example. The information terminal 100 includes a main controller 101, a system bus 102, a memory unit 104, a storage unit 110, a video processing unit 120, an audio processing unit 130, an operation unit 140, a communication processing unit 150, a sensor unit 160, and an extended interface (I/F) unit 170.

The information terminal 100 may be a digital camera, a mobile phone having a camera function, a smartphone, a tablet terminal, or the like. In addition, the information terminal 100 may be PDA (Personal Digital Assistants) or a laptop PC (Personal Computer). In addition, the information terminal 100 may be a video camera capable of capturing a video image, a mobile game machine, or another mobile digital device.

The main controller 101 is a microprocessor unit that controls the entire information terminal 100 in accordance with a predetermined program. The system bus 102 is a data communication path through which data is transmitted and received between the main controller 101 and the units included in the information terminal 100.

The memory unit 104 serves as a program region at the time of the execution of a basic operation program or another application program and serves as a temporal storage region for temporarily holding data at the time of the execution of various application programs when necessary. The memory unit 104 may be integrated with the main controller 101.

The storage unit 110 stores various operational setting values of the information terminal 100, information of a user of the information terminal 100, and the like. In addition, the storage unit 110 can store still image data captured by the information terminal 100, video data captured by the information terminal 100, and the like. In addition, the information terminal 100 can expand a function by downloading a new application program via the Internet from an application server. In this case, the downloaded new application program is stored in the storage unit 110. When the main controller 101 loads the new application program stored in the storage unit 110 into the memory unit 104 and executes the loaded new application program, the information terminal 100 can achieve a wide variety of new functions.

The storage unit 110 needs to hold stored information even in a state in which power is not supplied to the information terminal 100. Therefore, for example, a device, such as a flash ROM, an SSD (Solid State Drive), or an HDD (Hard Disc Drive), is used.

The display unit 121 is a display device such as a liquid crystal panel, for example. The display unit 121 provides video data processed by a video signal processing unit 122 to the user of the information terminal 100.

The video processing unit 120 includes the video signal processing unit 122, the first video input unit 123, the second video input unit 124, and the third video input unit 125.

The audio processing unit 130 includes an audio output unit 131, an audio signal processing unit 132, and an audio input unit 133. The audio output unit 131 is a speaker and provides an audio signal processed by the audio signal processing unit 132 to the user of the information terminal 100. The audio input unit 133 is a microphone and converts voice of the user or the like into audio data and inputs the audio data. The audio input unit 133 may be separated from the information terminal 100 and connected to the information terminal 100 via wired communication or wireless communication.

The operation unit 140 is an instruction input unit that inputs an operation instruction to the information terminal 100. In the present example, the operation unit 140 includes a touch panel display 140t stacked on the display unit 121 and operational keys formed by arranging button switches. The operational keys formed by arranging the button switches may not be provided. In addition, a keyboard connected to the extended interface unit 170 described later or the like may be used to operate the information terminal 100. Another information terminal device connected via wired communication or wireless communication may be used to operate the information terminal 100. Furthermore, the foregoing touch panel function may be included in the display unit 121.

The communication processing unit 150 includes a LAN (Local Area Network) communication unit 151, a mobile phone network communication unit 152, and a proximity wireless communication unit 153. The LAN communication unit 151 is connected to an Internet access point for wireless communication via wireless communication and transmits and receives data to and from the Internet access point. The mobile phone network communication unit 152 executes telephone communication (calling) and transmits and receives data via wireless communication with a base station of a mobile phone communication network. The proximity wireless communication unit 153 executes wireless communication in close proximity to a corresponding reader/writer. Each of the LAN communication unit 151, the mobile phone network communication unit 152, and the proximity wireless communication unit 153 includes an encoding circuit, a decoding circuit, an antenna, and the like and may include an infrared communication unit and the like.

The sensor unit 160 is a sensor group for detecting a state of the information terminal 100. In the example, the sensor unit 160 includes a global positioning system (GPS) receiver 161, an acceleration sensor 162, a gyroscope sensor 163, a geomagnetic sensor 164, an illuminance sensor 165, and a proximity sensor 166. The sensor group can detect the position, motion, inclination, and orientation of the information terminal 100, brightness around the information terminal 100, a proximity state of an object present around the information terminal 100, and the like. The sensor unit 160 may include another sensor.

The extended interface unit 170 is an interface group for expanding a function of the information terminal 100. In the example, the extended interface unit 170 is composed of a video/audio interface, a USB (Universal Serial Bus) interface, a memory interface, and the like. The video/audio interface inputs a video signal and an audio signal from an external video/audio output device, outputs a video signal and an audio signal to an external video/audio input device, and the like. The USB interface connects a keyboard and another USB device. The memory interface connects a memory card and another memory medium and transmits and receives data.

Figure 2B:
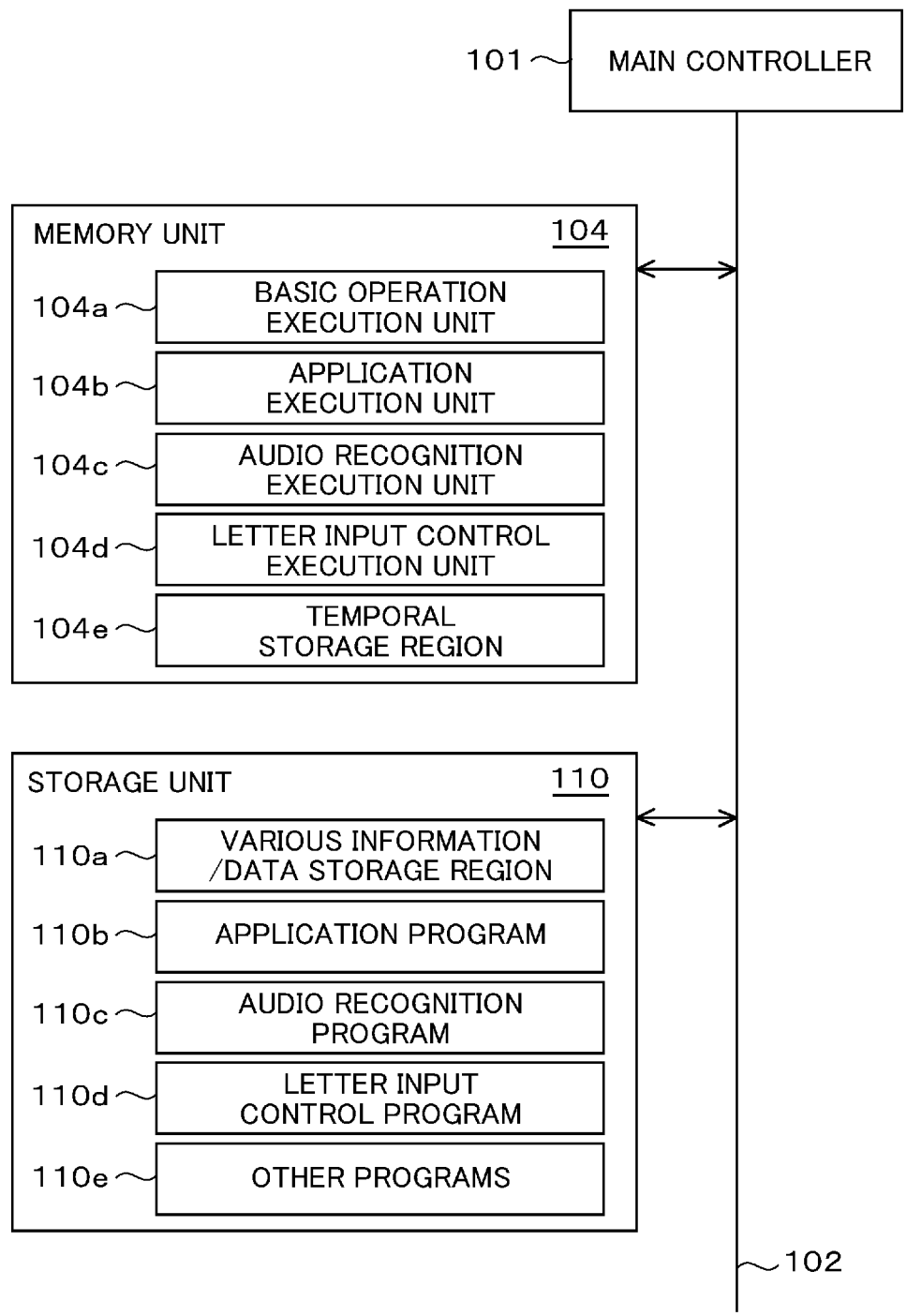
FIG. 2B is a software configuration diagram of the information terminal according to the example.

FIG. 2B is a software configuration diagram of the information terminal 100 according to the example and illustrates software configurations of the memory unit 104 and the storage unit 110.

An application program 110*b*, an audio recognition program 110*c*, and a letter input control program 110*d* that are stored in the storage unit 110 are controlled by an application execution unit 104*b*, an audio recognition execution unit 104*c*, a letter input control execution unit 104*d*, and a basic operation execution unit 104*a* that have been loaded into the memory unit 104, executed by the main controller 101, and configured. Alternatively, the information terminal 100 according to the example may further include hardware blocks achieved by causing hardware to execute operations that are the same as or similar to those of the foregoing application execution unit 104*b*, the audio recognition execution unit 104*c*, and the letter input control execution unit 104*d*. The foregoing hardware blocks may control operations of the information terminal 100, instead of the application execution unit 104*b*, the audio recognition execution unit 104*c*, and the letter input control execution unit 104*d*. The application program described herein is not limited. The example assumes that the application program is an application with a letter input operation and is a mail application, a sentence creation application, a presentation application, or the like.

An example of the configurations of the information terminal 100 illustrated in FIGS. 2A and 2B includes many configurations not required in the example such as a portion of the communication processing unit 150 and a portion of the sensor unit 160. Even when the configurations do not include these portions, effects of the example are not lost. In addition, configurations not illustrated such as a digital television broadcast reception function and an electronic money payment function may be further added.

FIG. 3 is a configuration diagram of the touch panel display 140*t* according to the example.

The touch panel display 140*t* includes a display unit 121 and a detector 140*a*. The display unit 121 displays an operation screen for a sentence such as a mail, a software keyboard with a predetermined array, and various information on a screen via the video processing unit 120. For example, the detector 140*a* detects a touch operation of the user for each detection region of each key on the software keyboard being displayed on the screen in the touch panel display 140*t* that is an LCD (Liquid Crystal Display) unit. For example, the detector 140*a* is a resistive film touch sensor, a surface acoustic wave touch sensor, an infrared touch sensor, an electromagnetic induction touch sensor, a capacitive touch sensor, or the like. A touch panel controller 140*b* extracts positional coordinates of an instruction point touched on the touch panel display 140*t* by a finger of the user that has been detected by the detector 140*a* or of an instruction point to which the finger is located close. Then, the touch panel controller 140*b* outputs the extracted positional coordinates to the main controller 101. The main controller 101 identifies an object selected by the touching by the user from positional relationships between the positional coordinates of the instruction point on the touch panel display 140*t* and positions of displayed various objects. For example, a letter object touched on the software keyboard is input to a sentence. The operation unit 140 is composed of the detector 140*a* and the touch panel controller 140*b*. The operation unit 140, however, is not limited only to this configuration and may include a button switch and the like. The operation unit 140 may further include an operation by audio input.

FIG. 4 illustrates an input example of a mail document according to the example. The information terminal 100 displays, on the touch panel display 140*t*, an English mail sentence "I have no casg cards, but I have not been in trouble in particular" input using the software keyboard. This sentence indicates that the user erroneously touched g instead of h when trying to input "cash" and "casg" was erroneously input.

Figure 5:
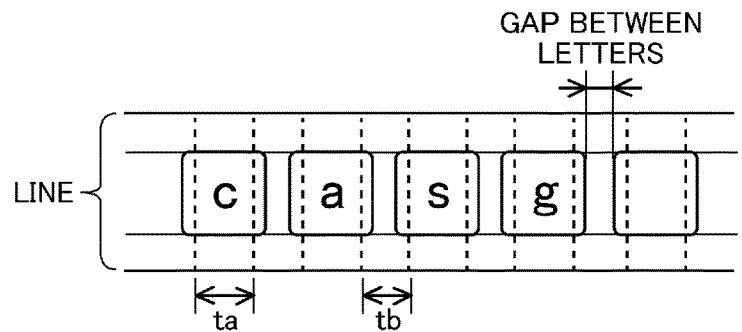
FIG. 5 is a diagram describing a touch detection region according to the example.

FIG. 5 is a diagram describing a touch detection region according to the example. In this example, a portion "casg" of one row "I have no casg . . . " of the mail sentence illustrated in FIG. 4 is extracted and displayed to explain the touch detection region. In addition, frames surrounding alphabets indicate letter regions, but frame lines are not actually displayed on the display screen. Similarly, lines indicating the row are illustrated for the explanation and are not displayed on the display screen. The letter regions are set based on font types and sizes of the letters, and the positions of the letter regions in the row are set based on the size of the row, the arrangement in the row, the specifying of gaps between the letters, and the like. When an area ta indicating a range of a letter region of an alphabet "c" in a width direction of the letter region is touched, the area is determined as the letter region and recognized as the letter "c". In addition, when an area of a range tb between the letters is touched, the area is determined as an inter-letter region between a letter "a" and a letter "s". For example, a length of ta is set to be 0.6 times as long as a length of a letter region of "c" in a horizontal direction so that lengths of the letter region from the center of the letter region on the left and right sides are equal to each other. In addition, tb is a range obtained by subtracting a length that is 0.5 times as long as ta of each letter from a distance between the centers of adjacent letter regions. Thus, a letter region and an inter-letter region can be appropriately detected even when there is a difference between font sizes of letters or when an entire sentence is enlarged or reduced. In this case, ta and tb are set so that ta=the letter region length×0.6 and tb=the distance between the centers of adjacent letter regions−ta (letter a)×0.5−ta (letter s)×0.5. The values, however, may be set as setting variables when necessary or may not be limited to this and may be set according to another method.

Operations of the information terminal 100 according to the example are described below. In addition, as illustrated in FIG. 2B, the operations of the information terminal 100 according to the example are mainly controlled by causing the letter input control program 110d stored in the storage unit 110 to be loaded into the memory unit 104 and executed by the main controller 101.

Figure 8A:
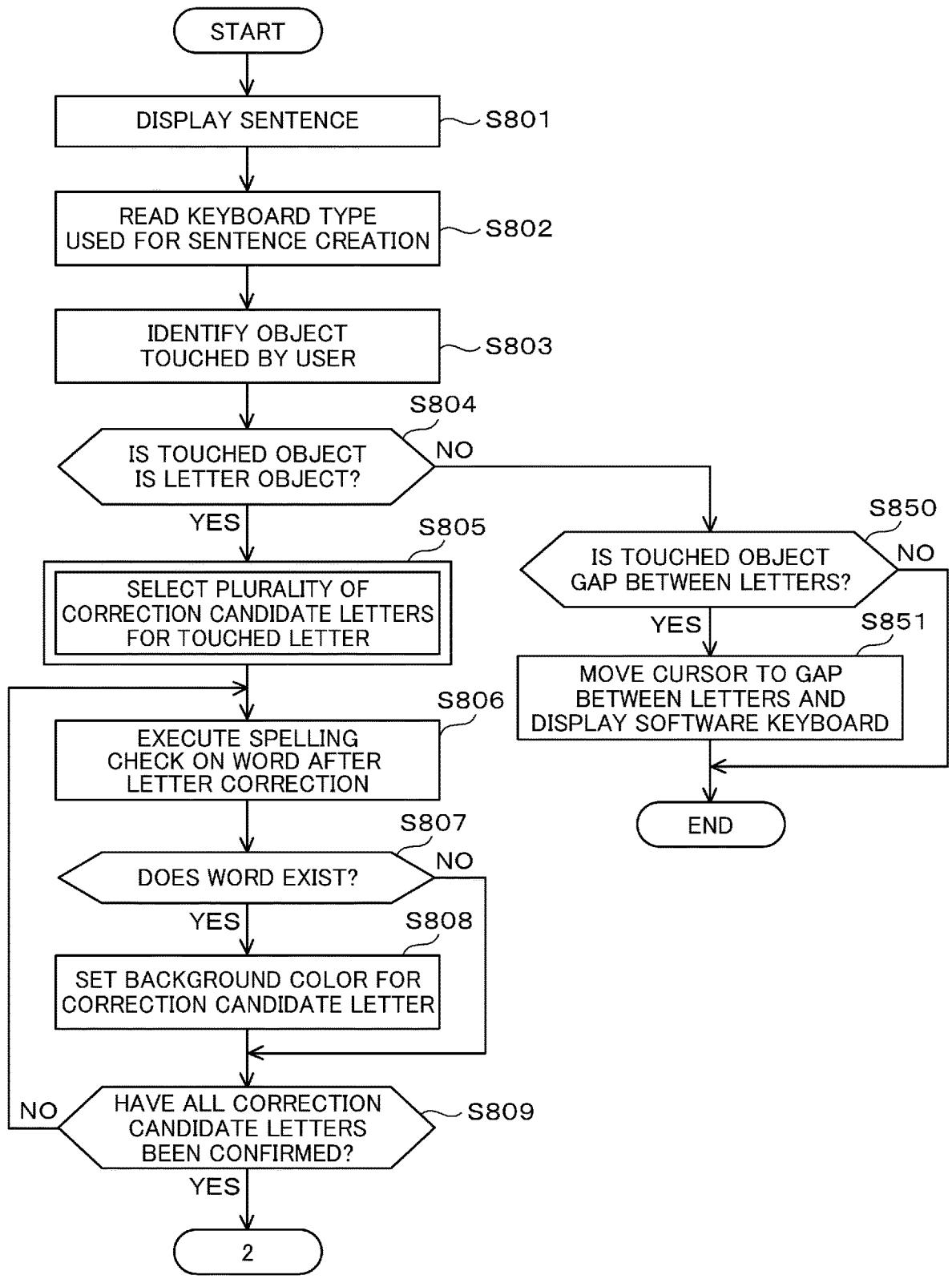
FIG. 8A is a flowchart of a letter correction process according to the example.
Figure 8B:
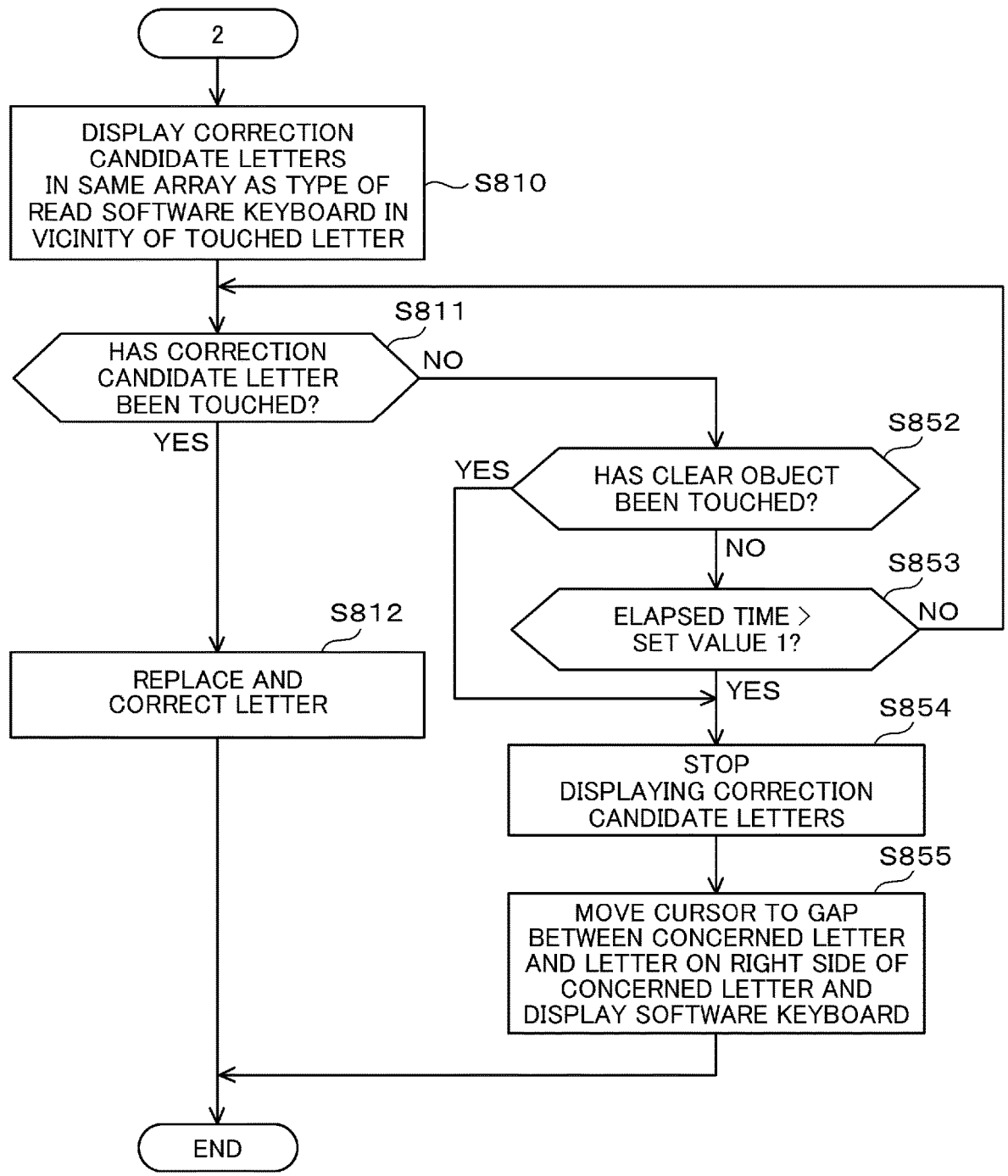
FIG. 8B is a flowchart of the letter correction process according to the example.

FIGS. 8A and 8B are flowcharts indicating a letter correction process of the information terminal 100 and describe the case where an erroneously input letter of the English mail sentence illustrated in FIG. 4 is corrected.

First, in step 801, the application program 110b displays the sentence.

Next, in step 802, the application program 110b reads the type of a keyboard used for the creation of the sentence. For each sentence, the type of a keyboard used for the creation of the sentence is stored as a property of the sentence. For example, when an alphabet that is one of letter objects is input as input information, the keyboard type is an object layout, such as the QWERTY layout or the Dvorak layout. For Japanese input, the keyboard type is an object layout, such as the JIS layout or phone-type input. It is sufficient if a 2-dimensional array of such letter objects is identified. In this case, the flow from opening of the sentence is described, but is not limited to this. The flow may be started from the creation of a new sentence. In this case, as the keyboard type, a keyboard type set for the creation of the new sentence may be used.

In step 803, after the user inputs the sentence illustrated in FIG. 4 and notices that "casg" has been erroneously input instead of "cash", the touch panel display 140t receives a touch operation for correction of the letter.

In step 804, the letter input control program 110d determines whether an object touched by the user is a letter object. Specifically, the letter input control program 110d determines whether a touched position in the row of the sentence illustrated in FIG. 5 is the region ta.

When the letter input control program 110d determines that the touched object is the letter object (Yes in step 804), the letter input control program 110d selects a plurality of correction candidate letters based on the touched letter in step 805. A method for selecting the plurality of correction candidate letters is described later.

Next, in step 806, the letter input control program 110d recognizes a word including the letter touched by the user, replaces the touched letter with one of the correction candidate letters, and executes spelling check.

In step 807, the letter input control program 110d determines whether a significant word has been configured as a result of the executed spelling check. When the letter input control program 110d determines that the significant word has been configured (Yes in step 807), the letter input control program 110d sets a background color for the concerned correction candidate letter in step 808.

In this case, the background color is set but the setting is not limited to the background color. It is sufficient as long as the concerned correction candidate letter is highlighted. For example, a letter color may be changed, or the letter may be bold, or the size of the letter may be changed. When the letter input control program 110d determines that the significant word has not been configured (No in step 807), the letter input control program 110d does not execute any operation and the process proceeds to step 809.

Next, in step 809, the letter input control program 110d determines whether the letter input control program 110d has executed the spelling check on all the correction candidate letters selected in step 805. When the letter input control program 110d determines that the letter input control program 110d has not executed the spelling check on all the correction candidate letters (No in step 809), the process returns to step 806 and the letter input control program 110d continuously executes the process. On the other hand, when the letter input control program 110d determines that the letter input control program 110d has executed the spelling check on all the correction candidate letters (Yes in step 809), the process proceeds to step 810.

When the letter input control program 110d determines that the touched object is not the letter object (No in step 804), the letter input control program 110d determines whether the touched object is a region between letters in step 850.

When the letter input control program 110d determines that the touched object is the region between the letters (Yes in step 850), the letter input control program 110d moves a cursor to the concerned gap between the letters and displays the software keyboard in step 851. Specifically, the letter input control program 110d is in a letter input waiting state that is a normal input mode, and the process is terminated. When the letter input control program 110d determines that the touched object is not the region between the letters (No in step 850), the letter input control program 110d does not execute any operation and terminates the process.

Figure 6:
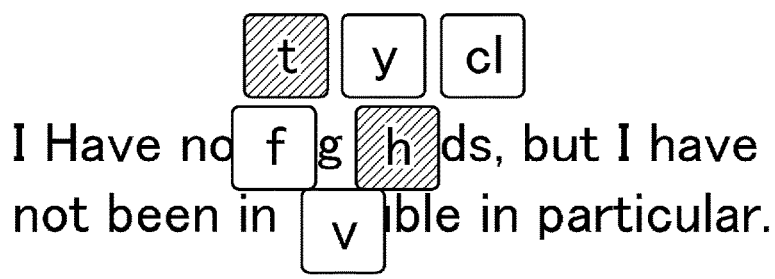
FIG. 6 illustrates a display example of correction candidate letters according to the example.

Next, the process proceeds to FIG. 8B. In step 810, the letter input control program 110d displays the correction candidate letters in the same array as the type of the read software keyboard in the vicinity of the correction letter that is the letter touched in the sentence and to be corrected, and displays a clear object to interrupt the process. Specifically, as illustrated in FIG. 6, the letter input control program 110d enlarges and displays peripheral letters t, y, f, h, and v present in the vicinity of the correction letter g of the keyboard type (in the case of the QWERTY layout) (the enlargement rate is set in advance) while maintaining positional relationships of the keyboard layout. The letter input control program 110d arranges a clear object cl on the outer side (on the right side in FIG. 6) of y that is one of the peripheral letters. A word obtained by replacing g with t or h is cast or cash and is determined as a significant word by the spelling check. Thus, the letter input control program 110d sets and displays a background color for the letters t and h. In addition, the position of the clear object is not limited as long as the clear object is present on the outer side of correction candidate letters. For example, the clear object may be arranged based on information indicating a characteristic of the user such as a dominant hand or a key input habit. The information may be stored in the memory unit 104 or the storage unit 110 in advance or may be defined based on statistics of past key input (for example, the number of times that the clear object arranged at a certain position is touched is larger than the number of times that a clear object arranged at another position is touched). By arranging the clear object on the outer side of the correction candidate letters arranged in the vicinity of the foregoing correction letter in consideration of the characteristic of the user, the usability can be improved.

Next, in step 811, the letter input control program 110*d* determines whether a correction candidate letter displayed in the vicinity of the correction letter has been touched by the user.

When the letter input control program 110*d* determines that the correction candidate letter has been touched (Yes in step 811), the letter input control program 110*d* replaces the correction letter with the touched correction candidate letter to correct the correction letter in step 812 and terminates the process.

When the letter input control program 110*d* determines that the correction candidate letter has not been touched (No in step 811), the letter input control program 110*d* determines whether the clear object has been touched in step 852.

When the letter input control program 110*d* determines that the clear object has not been touched (No in step 852), the letter input control program 110*d* determines whether a predetermined elapsed time has exceeded a set value 1 set in advance for time monitoring in step 853.

When the letter input control program 110*d* determines that the predetermined elapsed time has not exceeded the set value 1 (No in step 853), the letter input control program 110*d* branches the process to step 811, continuously executes the process, and waits for an operation of the user.

When the letter input control program 110*d* determines that the clear object has been touched (Yes in step 852) or that the predetermined elapsed time has exceeded the set value 1 (Yes in step 853), the letter input control program 110*d* stops displaying the correction candidate letters in step 854.

Figure 7:
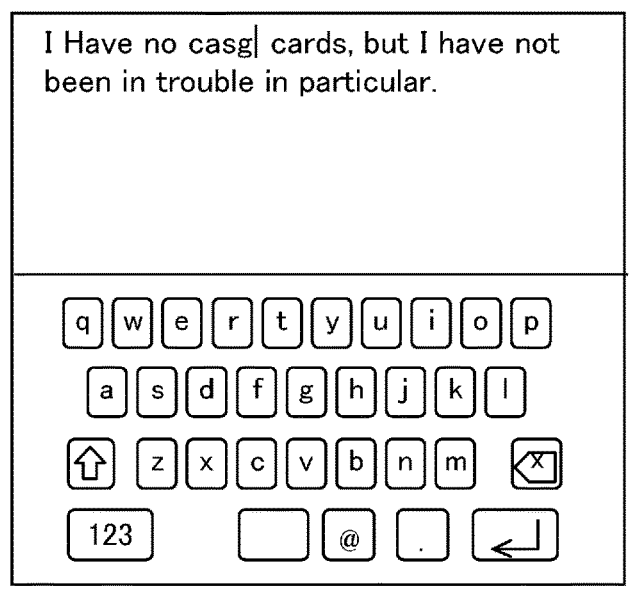
FIG. 7 illustrates a display example when a correction letter according to the example is long-pressed.

Next, in step 855, the letter input control program 110*d* moves the cursor to a gap between the correction letter touched by the user in step 803 and a letter adjacent to the correction letter (on the right or left side depending on the type of the language) as illustrated in FIG. 7 and displays the software keyboard. This is executed to switch the state to the letter input waiting state that is the normal input mode and to continue the process in the case where an appropriate correction candidate letter is not displayed among the correction candidate letters or where the touch of the correction letter is mistaken. The letter input control program 110*d* can branch the process to step 803 and display the correction candidate letters again when the user touches the correction object again. In addition, in the example, the mode is switched to the foregoing normal input mode when the clear object is touched. However, the letter input control program 110*d* may switch the mode to the normal input mode in the same manner when the letter input control program 110*d* does not display the clear object, determines whether the correction letter has been long-pressed and touched for a time period set in advance or more, and determines that the correction letter has been touched for the time period set in advance or more.

In FIGS. 8A and 8B, the letter input control program 110*d* determines whether a touch operation of touching a letter object or a gap between letters to correct the letter in steps S803 and S804 has been received, and the letter input control program 110*d* determines whether a correction candidate letter displayed in the vicinity of the correction letter has been touched by the user in step S811. However, for example, in steps S803 and S804, when the touch operation of touching the foregoing letter object is received, the letter input control program 110*d* determines whether a predetermined time has elapsed (for example, long pressing has been performed) after the reception of the touch operation of touching the letter object. When the letter input control program 110*d* determines that the foregoing predetermined time has elapsed, the letter input control program 110*d* identifies the touched letter as the correction letter. After that, the letter input control program 110*d* determines whether the finger of the user has been separated and the foregoing touch operation is no longer received. When the letter input control program 110*d* determines that the foregoing touch operation is no longer received, the letter input control program 110*d* may select and display the correction candidate letters in step S805.

In addition, when the letter input control program 110*d* determines that the touch operation of touching the foregoing letter object has been received or that the foregoing predetermined time has elapsed after the reception of the touch operation of touching the foregoing letter object, the letter input control program 110*d* identifies the touched letter as the correction letter. After that, the letter input control program 110*d* determines whether the finger of the user has been slid. When the letter input control program 110*d* determines that the finger has been slid, the letter input control program 110*d* may select and display, as a correction candidate letter, a letter object to which the finger has been slid in step S805.

(Modification of Selection of Correction Candidate Letter)

In the example of FIGS. 8A and 8B, the process is progressed based on the touch operation, but can be progressed based on a flip operation. Specifically, when the finger is not separated from the touch panel display and is detected before the predetermined time elapses after the touch of the correction letter, the letter input control program 110*d* displays the correction candidate letters. After the letter input control program 110*d* detects that the finger has been slid and that a correction candidate letter has been selected, the letter input control program 110*d* determines the selection of the correction letter by detecting that the finger has been separated from the correction candidate letter. In this case, the series of operations can be continuously executed and an operation of replacing the correction letter with the correction candidate letter can be executed with a smaller number of touches. In addition, when a time period for touching the correction letter is longer than the set value (long pressing), the displaying of the correction candidate letters is stopped, the cursor is moved to a gap between the touched correction letter and another letter adjacent to the touch correction letter (on the right or left side depending on the type of the language), the software keyboard is displayed, and the mode is changed to the foregoing normal input mode.

Next, a method for selecting a plurality of correction candidates for a touched letter (step 805) is described with reference to a flowchart of FIG. 9.

As a characteristic of letter input by the software keyboard, the number of times that a letter is erroneously input by erroneously touching an object in the vicinity of an input letter is large. Specifically, erroneous input caused by erroneously touching a correction letter when a letter in the vicinity of the correction letter of a keyboard type used for sentence creation (letter input) is tried to be touched is likely to occur.

Figure 10:
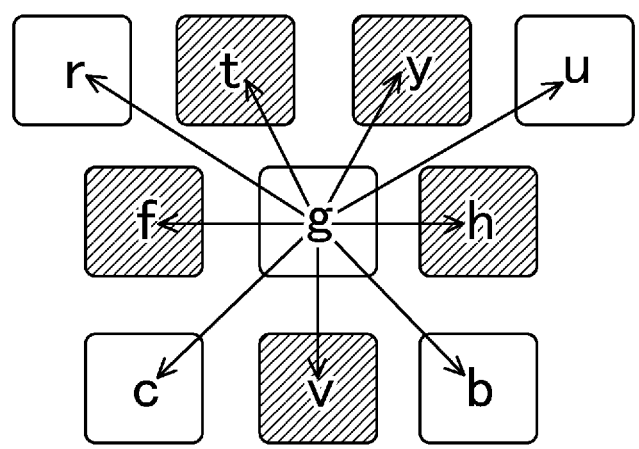
FIG. 10 is a diagram describing the selection of a correction candidate letter according to the example.
Figure 10:
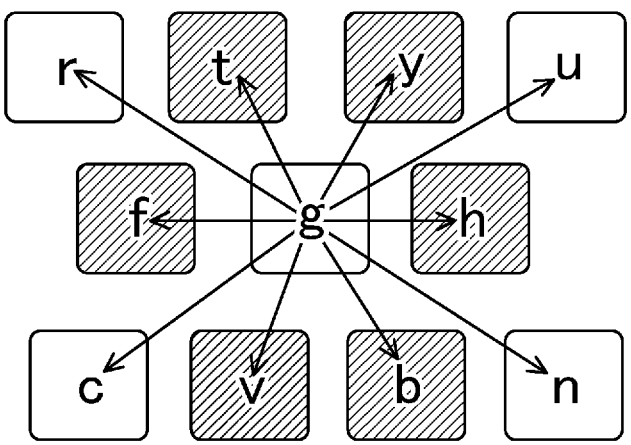

Therefore, in step 901, the letter input control program 110*d* acquires a keyboard layout used for input by reading a keyboard type used for the sentence creation (letter input). As a specific example, as illustrated in FIG. 10, a letter array in the vicinity of the correction letter g is acquired.

Next, in step 902, the letter input control program 110*d* calculates a distance between the center of the correction letter and the center of a peripheral letter on the keyboard layout.

In step 903, the letter input control program 110*d* calculates a normalized distance by dividing the distance calculated in step 902 by a distance between the center of a key g of the keyboard layout and the center of a key adjacent to the key g on the left or right side and treating, as "1", the distance between the center of the key g and the center of the adjacent key on the left or right side. The distance between the centers may be one of distances between the center of the key g and the centers of the keys adjacent to the key g on the left and right sides or may be a value obtained by dividing, by 2, a value obtained by summing distances between the center of the key g and the keys adjacent to the key g on the left and right sides. In this case, the distances are normalized based on the distances between the center of the key g and the keys adjacent on the left and right sides, but is not limited to this. It is sufficient if a relative distance between keys of the layout is calculated regardless of enlargement and reduction of the keyboard.

Next, in step 904, the letter input control program 110*d* determines whether each of the peripheral key normalized distances calculated in step 903 is smaller than a set value 2 set in advance for each of the peripheral letters.

When the letter input control program 110*d* determines that each of the foregoing peripheral key normalized distances is smaller than the set value 2 (Yes in step 904), the letter input control program 110*d* selects the letters as correction candidate letters in step 905. On the other hand, when the letter input control program 110*d* determines that the peripheral key normalized distances are not smaller than the set value 2 (No in step 904), the letter input control program 110*d* does not execute any operation and terminates the process.

A range from which peripheral keys are selected as correction candidate letters is determined based on the set value 2. For example, t, y, f, h, and v whose backgrounds are colored are selected as correction candidate letters by setting "1.4" to the set value 2 for a QWERTY layout software keyboard of a type indicated by (1) in FIG. 10. Whether c and b are to be included and whether r and u are to be included are determined based on the value of the set value 2. In addition, t, y, f, h, v, and b whose backgrounds are colored are selected as correction candidate letters by setting "1.4" to the set value 2 for a QWERTY layout software keyboard of a type that is similar to the layout of a QWERTY layout hardware keyboard and indicated by (2) in FIG. 10. Whether r, u, c, and n are to be further included is determined based on the value of the set value 2. Since keyboard layouts are different for keyboard types, it is desirable that a set value 2 be set for each keyboard type.

Although the example describes the method for correcting the erroneous input in the English sentence, the example is applicable to correction of erroneous input in a Japanese sentence. Specifically, when a key indicating a Kana character is touched for a Japanese sentence including a Kanji character and the Kana character, and (1) the software keyboard type is a Roman letter input type, the letter input control program 110*d* displays Roman letters. For example, when the touched letter is a Japanese Kana character "ka", the letter input control program 110*d* displays "ka". When k is touched next, the letter input control program 110*d* displays a correction candidate letter based on the keyboard layout in the vicinity of k. In addition, when a is touched, the letter input control program 110*d* displays a correction candidate letter in the vicinity of a, but the correction candidate letter is not displayed based on the keyboard layout, but is displayed based on letters of the Japanese "ka" column. Specifically, the letter input control program 110*d* displays i, u, e, and o corresponding to vowels of Japanese Kana characters "ka", "ki", "ku", "ke", and "ko". By executing multiple steps in this manner, this is applicable like the foregoing example.

In addition, (2) when the software keyboard is of a single-touch Kana input type, the letter input control program 110*d* displays a correction candidate letter based on the keyboard layout in the vicinity of a touched letter. For example, when a Japanese Kana character "ka" is touched, the letter input control program 110*d* displays, as correction candidate letters, Japanese Kana characters e, o, su, n, ha, and ki in the vicinity of the Japanese Kana character "ka.

In addition, (3) when the software keyboard is of a Kana input type based on multi-tap such as multi-press, the letter input control program 110*d* displays a keyboard layout in the vicinity of a correction letter without displaying a correction candidate character in the vicinity of a touched letter. For example, when the correction character is the Japanese Kana character "ka", the letter input control program 110*d* displays a keyboard layout of the Japanese a, sa, and na columns in the vicinity of the correction character and displays a keyboard layout of the Japanese ka column at the position of the correction character. More specifically, in the case where the Japanese Kana character "ka" is corrected to a Japanese Kana character "ni", the Japanese Kana character "ka" is corrected to the Japanese Kana character "ni" by touching twice a Japanese Kana character "na" displayed in the vicinity of the correction character.

In addition, when a Kanji character in a Japanese sentence including the Kanji character and a Kana character is touched, the letter input control program 110*d* inversely converts the Kanji character into a Kana character before Kana-to-Kanji conversion in single Kanji units, idiom units, or clause units and displays the Kana character. It is desirable that the character be displayed so that it is clear that the character is before the Kana-to-Kanji conversion in consideration of user convenience. Next, when a character included in Kana characters before the Kana-to-Kanji conversion and to be corrected is touched, the letter input control program 110*d* executes the same process as that to be executed when a Kana character included in the foregoing Japanese sentence is touched, and the letter input control program 110*d* executes the Kana-to-Kanji conversion and terminates the process. When the Kanji character is touched and the Kana character before the Kana-to-Kanji conversion is displayed in order to execute the Kana-to-Kanji conversion, it is desirable that the letter input control program 110*d* display the software keyboard at the same time in consideration of user convenience.

In this manner, according to the example, as illustrated in FIGS. 8A and 8B, the application execution unit 104*b* (application program 110*b*) reads information on an array of objects for input that have been displayed on the display unit upon input of input information, and the letter input control execution unit 104*d* (letter input control execution program 110d) determines whether an input object of the input information that is displayed on the display unit has been touched. When the letter input control execution unit 104d determines that the input object has been touched, the letter input control execution unit 104d recognizes the touched input object as an object to be corrected, displays a correction candidate object based on the array of the objects for input in the vicinity of the object to be corrected, and determines whether the correction candidate object has been touched. When the letter input control execution unit 104d determines that the correction candidate object has been touched, the letter input control execution unit 104d replaces the object to be corrected with the touched correction candidate object, and thus the letter of the input information can be corrected with a smaller number of touches. In addition, it is possible to quickly and accurately correct a sentence with erroneous input to correct input.

In addition, as indicated by steps S806, S807, and the like in FIG. 8A, the foregoing letter input control execution unit 104d determines whether an object that includes a correction candidate object and is after correction has a significant configuration. When the letter input control execution unit 104d determines that the object after the correction has the significant configuration, the letter input control execution unit 104d highlights the correction candidate object determined as having the significant configuration. Therefore, the user can easily visually recognize the correction candidate and reduce erroneous touches on the correction candidate object.

In addition, as indicated by step S851 and the like in FIG. 8, the letter input control execution unit 104d determines whether a gap between input objects has been touched. When the letter input control execution unit 104d determines that the gap between the input objects has been touched, the letter input control execution unit 104d reads an array of the input objects and goes into the input waiting state to wait for input information. Therefore, even when the user touches the gap between the input objects, the letter input control execution unit 104d can quickly prepare for next input.

In addition, as indicated by step S810 and the like in FIG. 8B, the foregoing letter input control execution unit 104d displays the clear object on the outer side of a correction candidate object at the time of the displaying of the correction candidate object. Therefore, the user easily performs an operation of clearing the touched correction candidate object.

In addition, as indicated by step S810 and the like in FIG. 8B, the foregoing letter input control execution unit 104d arranges the clear object based on a characteristic of the user who inputs the input information. It is therefore possible to improve convenience for each user in the foregoing clearing operation.

In addition, as indicated by step S855 and the like in FIG. 8B, the foregoing letter input control execution unit 104d determines whether the predetermined time has elapsed without a touch on a displayed correction candidate object. When the letter input control execution unit 104d determines that the predetermined time has elapsed without the touch on the correction candidate object, the letter input control execution unit 104d stops displaying correction candidate objects and goes into the input waiting state to wait for input information. Therefore, even when the user stops correction using the correction candidate object, the letter input control execution unit 104d can quickly prepare for next input.

Although the embodiment is described above, the embodiment is not limited to the foregoing example and various modifications can be considered. For example, when a word obtained by replacing a correction letter with a correction candidate letter has a significant meaning as a result of the spelling check, a background color is set for the correction candidate letter. The embodiment, however, is not limited to this. For example, by storing histories of combinations of correction letters obtained by replacing correction letters, a background color may be set for a correction candidate letter that is frequently mistaken. In addition, the values and the like that are described in the present specification and illustrated in the drawings are an example and may be different values and the like.

Some or all of the foregoing functions and the like may be achieved using hardware by designing with an integrated circuit or the like, for example. In addition, some or all of the foregoing functions and the like may be achieved using software by causing a microprocessor unit or the like to interpret and execute a program that achieves the functions and the like. The hardware and the software may be used together.

REFERENCE SIGNS LIST

100: Information terminal, 140*t*: Touch panel display, 140: Operation unit, 140*a*: Detector, 140*b*: Touch panel controller, 120: Video processing unit, 121: Display unit, 101: Main controller, 104: Memory unit, 110: Storage unit

The invention claimed is:

1. An input information correction method comprising:
    displaying, on a touch panel display, a sentence which comprises letter objects corresponding to a plurality of letter information input by a software keyboard;
    when one of the letter objects is determined to have been touched, recognizing the touched letter object as an object to be corrected;
    reading software keyboard type information, which has been stored as property information of the letter information when the letter information has been input by the software keyboard, and indicates one or more types of the software keyboard used for the inputting of the letter information;
    displaying, on the touch panel display, correction candidate objects, that are different from the touched letter object and are selected based on the software keyboard type information in a periphery of and adjacent to the touched letter object;
    determining whether one of the displayed correction candidate objects has been touched; and
    when one of the displayed correction candidate objects is determined to have been touched, replacing the touched letter object with the touched correction candidate object.

2. The input information correction method according to claim 1, further comprising:
    before determining whether one of the displayed correction candidate objects has been touched:
    determining whether a particular correction candidate object has a significant configuration when the object to be corrected is replaced with the particular correction candidate object; and
    highlighting and displaying the particular correction candidate object when the particular correction candidate object is determined to have the significant configuration.

3. The input information correction method according to claim 1, further comprising:

determining, when the letter object is determined as not having been touched, whether a gap between letter objects has been touched; and when the gap between the letter objects is determined to have been touched, displaying the objects for input on the display and setting a state to wait for input of letter information.

4. The input information correction method according to claim 1, further comprising:

displaying a clear object on an outer side of the displayed correction candidate objects.

5. The input information correction method according to claim 4, further comprising:

arranging the clear object based on a characteristic of a user who inputs the letter information.

6. The input information correction method according to claim 1, further comprising:

determining whether a predetermined time has elapsed without a touch on the displayed correction candidate objects;

stopping displaying the correction candidate objects when the predetermined time is determined to have elapsed without the touch on the displayed correction candidate objects; and displaying the objects for input on the display and setting a state to wait for input of input information.

7. The input information correction method according to claim 1, wherein the software keyboard type information is associated with key-layout information of the software keyboard used for the inputting of the letter information.

8. The input information correction method according to claim 7, further comprising:

selecting particular correction candidate objects from the correction candidate objects; and displaying the correction candidate objects and highlighting the particular correction candidate objects, wherein the particular correction candidate objects are selected based on a key distance between the touched object and each of the correction candidate objects calculated based on the key-layout information.

9. The input information correction method according to claim 1, wherein the type of software keyboard is QWERTY, Dvorak, JIS or phone-type.

10. An information terminal comprising a controller, wherein the controller:

displays, on a touch panel display, a sentence which comprises letter objects corresponding to a plurality of letter information input by a software keyboard;

recognizes, when one of the letter objects is determined to have been touched, the touched letter object as an object to be corrected;

reads software keyboard type information which has been stored as property information of the letter information when of the letter information has been input by the software keyboard and indicates one or more types of the software keyboard used for the inputting of the letter information;

displays, on the touch panel display, correction candidate objects, that are different from the touched letter object and are selected based on the software keyboard type information, in a periphery of and adjacent to the touched letter object;

determines whether one of the correction candidate objects has been touched; and replaces, when one of the correction candidate objects is determined to have been touched, the touched letter object with the touched correction candidate object.

11. The information terminal according to claim 10, wherein, before determining whether one of the displayed correction candidate objects has been touched:

the controller determines whether a particular correction candidate object has a significant configuration when the object to be corrected is replaced with the particular correction candidate object, and the controller highlights and displays the particular correction candidate object when the particular correction candidate object is determined to have the significant configuration.

12. The information terminal according to claim 10, wherein the controller determines whether a gap between letter objects has been touched, and the controller displays the objects for input on the display and sets a state to wait for input of letter information when the gap between the letter objects is determined to have been touched.

13. The information terminal according to claim 10, wherein the controller displays a clear object on an outer side of the displayed correction candidate objects.

14. The information terminal according to claim 13, wherein the controller arranges the clear object based on a characteristic of a user who inputs the letter information.

15. The information terminal according to claim 10, wherein the controller determines whether a predetermined time has elapsed without a touch on the displayed correction candidate objects, wherein the controller stops displaying the correction candidate objects when the predetermined time is determined to have elapsed without the touch on the displayed correction candidate objects, and wherein the controller displays the objects for input on the display and sets a state to wait for input of input information.

16. The information terminal according to claim 10, wherein the software keyboard type information is associated with key-layout information of the software keyboard used for the inputting of the letter information.

17. The information terminal according to claim 16, wherein the controller:

selects particular correction candidate objects from the correction candidate objects; and displays the correction candidate objects and highlighting the particular correction candidate objects, wherein the particular correction candidate objects are selected based on a key distance between the touched object and each of the correction candidate objects calculated based on the key-layout information.

18. The information terminal according to claim 10, wherein the type of software keyboard is QWERTY, Dvorak, JIS or phone-type.

* * * * *